(12) United States Patent
Gates, III et al.

(10) Patent No.: US 7,680,908 B2
(45) Date of Patent: Mar. 16, 2010

(54) STATE REPLICATION

(75) Inventors: William H. Gates, III, Medina, WA (US); Gary W. Flake, Bellevue, WA (US); James R. Larus, Mercer Island, WA (US); Debi P. Mishra, Bellevue, WA (US); Chandramohan A. Thekkath, Palo Alto, CA (US); Raymond E. Ozzie, Seattle, WA (US); Lili Cheng, Bellevue, WA (US); Nishant V. Dani, Redmond, WA (US); Daniel S. Glasser, Mercer Island, WA (US); Alexander G. Gounares, Kirkland, WA (US); Henricus Johannes Maria Meijer, Mercer Island, WA (US); Amit Mital, Kirkland, WA (US); Ira L. Snyder, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 671 days.

(21) Appl. No.: 11/536,520

(22) Filed: Sep. 28, 2006

(65) Prior Publication Data
US 2008/0082652 A1     Apr. 3, 2008

(51) Int. Cl.
*G06F 15/16* (2006.01)
*G06F 15/177* (2006.01)
*G06F 9/00* (2006.01)
*G06F 1/24* (2006.01)

(52) U.S. Cl. .............. 709/220; 709/203; 709/204; 709/222; 709/227; 709/228; 713/1; 713/100

(58) Field of Classification Search ......... 709/201–203, 709/223–228, 208
See application file for complete search history.

(56) References Cited

U.S. PATENT DOCUMENTS

| 5,263,165 A | 11/1993 | Janis |
| 5,495,576 A | 2/1996 | Ritchey |
| 5,537,404 A | 7/1996 | Bentley et al. |
| 5,588,914 A | 12/1996 | Adamczyk |
| 5,859,972 A | 1/1999 | Subramaniam et al. |
| 6,064,656 A | 5/2000 | Angal et al. |

(Continued)

FOREIGN PATENT DOCUMENTS

EP     0915595 A2     5/1999

(Continued)

OTHER PUBLICATIONS

International Search Report and Written Opinion for PCT Patent Application PCT/US2007/079610, completed Nov. 14, 2008 and mailed Nov. 18, 2008, 13 pages.

(Continued)

*Primary Examiner*—Wing F Chan
*Assistant Examiner*—David Yi
(74) *Attorney, Agent, or Firm*—Lee & Hayes, PLLC

(57) ABSTRACT

The claimed subject matter provides systems and/or methods that facilitate replicating a state associated with a client, user, service, application, and the like. A third party service provider can support any number of services that can be concurrently requested by several clients without user perception of degraded computing performance as compared to conventional systems/techniques due to improved connectivity and mitigated latencies. A replication component can generate replicas of states associated with requested services. Further, the replicas can facilitate seamlessly interacting with the third party service provider (e.g., while transitioning between client devices). Additionally, by providing replicas of the state related information, differing third party service providers can effectuate services based upon a request from a client without regenerating the state.

16 Claims, 11 Drawing Sheets

U.S. PATENT DOCUMENTS

| | | | |
|---|---|---|---|
| 6,185,567 | B1 | 2/2001 | Ratnaraj et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,341,127 | B1 | 1/2002 | Katsube et al. |
| 6,349,337 | B1 * | 2/2002 | Parsons et al. ............ 709/227 |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,448,958 | B1 * | 9/2002 | Muta ..................... 345/169 |
| 6,469,991 | B1 | 10/2002 | Chuah |
| 6,496,482 | B1 | 12/2002 | Kubota |
| 6,620,043 | B1 | 9/2003 | Haseltine et al. |
| 6,707,820 | B1 | 3/2004 | Arndt et al. |
| 6,745,224 | B1 | 6/2004 | D'Souza et al. |
| 6,845,390 | B1 * | 1/2005 | Jorgenson et al. .......... 709/205 |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,099,946 | B2 * | 8/2006 | Lennon et al. ............ 709/227 |
| 7,363,365 | B2 * | 4/2008 | Ocko et al. ................ 709/223 |
| 7,373,377 | B2 | 5/2008 | Altieri |
| 2002/0059425 | A1 * | 5/2002 | Belfiore et al. ............ 709/226 |
| 2002/0124053 | A1 | 9/2002 | Adams et al. |
| 2003/0074386 | A1 * | 4/2003 | Schmidt et al. ................ 709/1 |
| 2003/0105734 | A1 | 6/2003 | Hitchen et al. |
| 2003/0229623 | A1 | 12/2003 | Chang et al. |
| 2004/0027375 | A1 * | 2/2004 | Ellis et al. ................... 345/753 |
| 2004/0049537 | A1 | 3/2004 | Titmuss |
| 2004/0076160 | A1 | 4/2004 | Phaltankar |
| 2004/0098456 | A1 | 5/2004 | Kryzanowski et al. |
| 2005/0033669 | A1 | 2/2005 | Stremler et al. |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2006/0183469 | A1 * | 8/2006 | Gadson ...................... 455/419 |
| 2007/0094343 | A1 * | 4/2007 | Sangle et al. ............... 709/207 |
| 2007/0115123 | A1 | 5/2007 | Roberts et al. |
| 2007/0136572 | A1 | 6/2007 | Chen et al. |
| 2007/0150602 | A1 * | 6/2007 | Yared et al. ................ 709/227 |
| 2008/0010496 | A1 * | 1/2008 | Das et al. ....................... 714/6 |

FOREIGN PATENT DOCUMENTS

| | | |
|---|---|---|
| EP | 1058429 A1 | 12/2000 |
| EP | 1376309 | 1/2004 |
| EP | 1524580 A2 | 4/2005 |
| EP | 1564622 | 8/2005 |
| JP | 2001282634 A | 10/2001 |
| KR | 1020040038271 A | 5/2004 |
| KR | 1020040107152 A1 | 12/2004 |
| KR | 1020060057563 A1 | 5/2006 |
| WO | WO 0008814 A1 | 2/2000 |
| WO | WO 04002107 A1 | 12/2003 |
| WO | 2005022826 | 10/2006 |

OTHER PUBLICATIONS

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29 , Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004. pp. 1-137.

James Surowiecki. The Wisdom of Crowds. Doubleday, 2004. pp. 138-306.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/ pdf &identifier=oai:arXiv.org:cs/0502091. Last accessed Sep. 20, 2006.

International Search Report for PCT Application No. US2007/079598 dated Jan. 30, 2008, 10 pages.

International Search Report for PCT Application No. US2007/079606 dated Feb. 27, 2008, 10 pages.

OA for U.S. Appl. No. 11/536,449, dated Jan. 26, 2009, 34 pages.

* cited by examiner

STATE REPLICATION

BACKGROUND

Conventionally, most computational tasks are performed upon a client or a server within a proprietary intranet. For example, a software application resident upon a client can be utilized by the client to effectuate operations such as creating data, obtaining data, manipulating data and/or storing data in memory associated with the client. Further, corporate entities and universities oftentimes employ one or more servers to perform tasks such as data storage/retrieval, data warehousing/analysis, electronic mail and/or backup. These servers and/or clients within the proprietary intranet can include software applications that provide functionality such as network browsing, word processing, electronic mail management, and so forth.

As the aforementioned computational tasks are effectuated, clients and servers are associated with particular states. For instance, states can relate to sets of properties or contexts of the client and/or the server. According to an illustration, the states can pertain to software application(s) currently being employed by the client and/or server, information that is available to a user of the client (e.g., displayed by a graphical user interface), amount of resources (e.g., bandwidth, processing power, memory, . . . ) being employed to perform the computational tasks, and the like. Further, the states can change upon occurrence of an event (e.g., initiating or terminating a computational task, booting a client or server, providing a query or password, changing a setting or preference, . . . ).

The states of clients and servers can be employed by respective clients and servers for a myriad of reasons. By way of example, the state can be utilized to provide access to data retained in memory when employing a first client device. However, as a user switches from utilizing the first client or server to a second client or server, the user oftentimes has to recreate the state. Thus, if a set of data is available for access with a desktop computer, when a user shifts to utilizing a laptop computer, she commonly has to recreate the state to have access to the same set of data (e.g., by way of providing a password, copying a file, restarting a software application, opening a document, . . . ).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate replicating a state associated with a client, user, service, application, and the like. A third party service provider can support most any number of services that can be concurrently requested by several clients without user perception of degraded computing performance as compared to conventional systems/techniques due to improved connectivity and mitigated latencies. A replication component can generate replicas of states associated with requested services. Further, the replicas can facilitate seamlessly interacting with the third party service provider (e.g., while transitioning between disparate client devices). Additionally, by providing replicas of the state related information, differing third party service providers can effectuate services based upon a request from a client without regenerating the state.

In accordance with various aspects of the claimed subject matter, backend services can be effectuated upon a third party service provider. For instance, a user can utilize a client device (e.g., thin client) such as a desktop device, portable device, cellular telephone, etc. to perform requests for services, and a corresponding user interface can be rendered upon the client device. Thereafter, the user can continue the interaction while employing a disparate client device (e.g., transitioning from a first client device to a second client device), and accordingly, the disparate client device can be provided with state related information to allow seamless interaction between the user and the requested services (e.g., rendering a similar user interface upon the disparate client device as compared to the first client device).

Pursuant to one or more aspects of the claimed subject matter, a migration component can enable migrating computations between client devices, a client device and a third party service provider, disparate third party service providers, etc. The migration can depend upon characteristics associated with the client device such as limitations related to processing, memory, bandwidth, display size, and the like. Thus, a user can initiate a computational task from a first client device and subsequently decide to continue the task with a disparate client device; accordingly, performance of the computations can be shifted between differing components. Moreover, a computational task and state can be split between different devices; thus, two or more client devices can concurrently perform respective portions of the computational task and the associated state can distributed between the two or more client devices, for example. Further, migration can automatically be effectuated and/or can be performed pursuant to feedback obtained in response to a suggestion.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

BRIEF DESCRIPTION OF THE DRAWINGS

FIG. 8 illustrates an exemplary methodology that facilitates replicating a state associated with a client, user, service, application, and the like.

DETAILED DESCRIPTION

Figure 1:
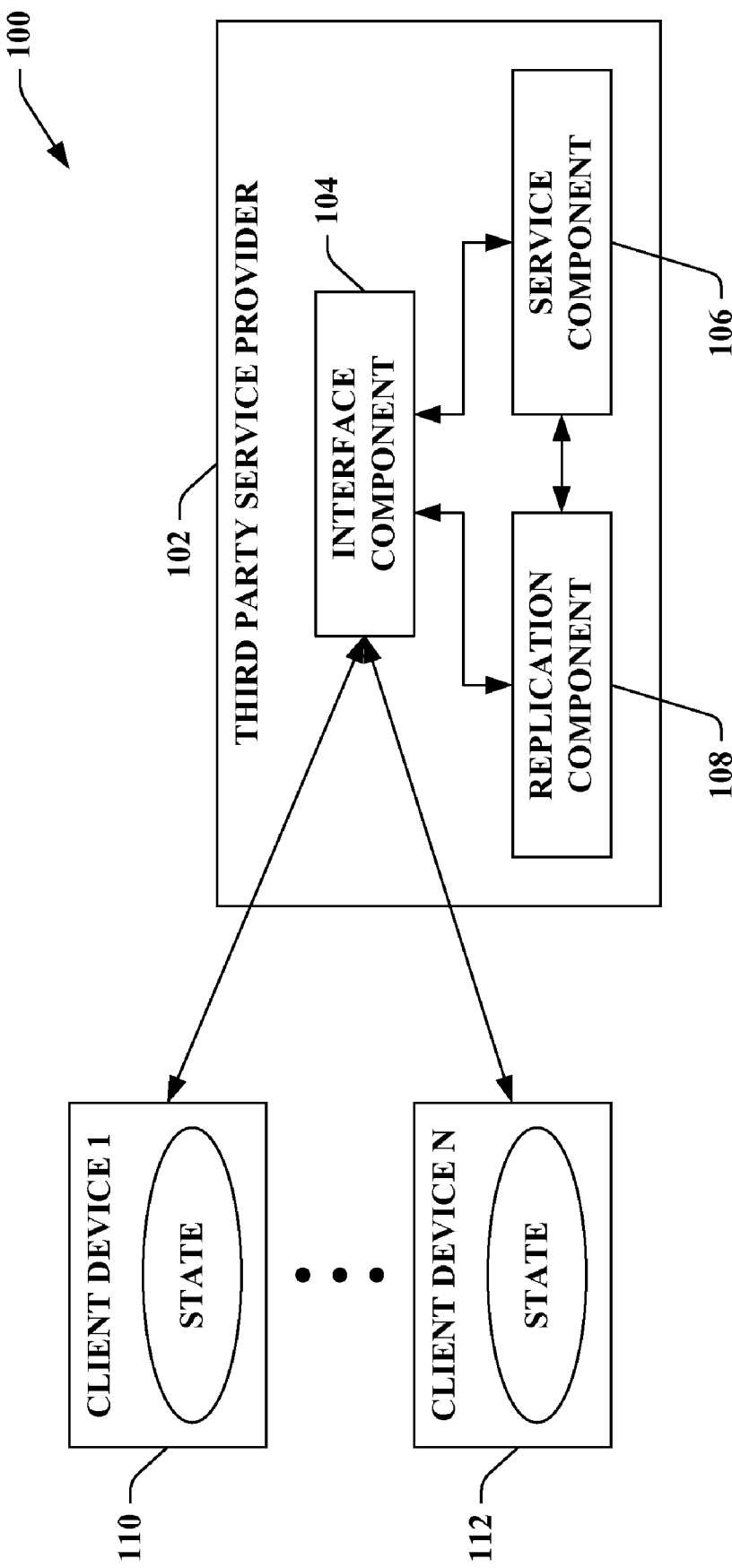
FIG. 1 illustrates a block diagram of an exemplary system that facilitates replicating a state associated with a device, service, application and/or user.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates replicating a state associated with a device, service, application and/or user. The system 100 includes a third party service provider 102 that can concurrently service requests from several clients without user perception of degraded computing performance as compared to conventional techniques where computational tasks can be performed upon a client or a server within a proprietary intranet. The third party service provider 102 (e.g., "cloud") supports a collection of hardware and/or software resources. Such hardware and/or software resources can be maintained by an off-premises party and the resources can be accessed by an identified user over a network (e.g., Internet, WAN, . . . ). Resources provided by the third party service provider 102 can be centrally located and/or distributed at various geographic locations. For instance, the third party service provider 102 can provide resources such as data storage services, computational services, word processing services, gaming services, web syndication services (e.g., subscribing to a RSS feed), and any other services or applications that are conventionally associated with personal computers and/or local servers. Further, utilization of any number of third party service providers similar to the third party service provider 102 is contemplated. According to an illustration, disparate third party service providers can be maintained by differing off-premise parties and a user can employ (e.g., concurrently, at different times, . . . ) all or a subset of the third party service providers.

The third party service provider 102 can further include an interface component 104 that can receive request(s) (e.g., for services) and/or respond to such request(s). The interface component 104 can obtain and/or transmit data over a network connection. Also, the interface component 104 can collect state related data (e.g., data from which a state can be determined). For example, the state related data can automatically be received by the interface component 104 (e.g. with a service related request) and/or obtained in response to a transmission sent by the interface component 104.

Additionally, the third party service provider 102 can include a service component 106 that effectuates performing service(s) supported by the third party service provider 102. The service component 106 can enable storing, collecting, manipulating, outputting, etc. data. Although one service component 106 is depicted, it is contemplated that any number of service components similar to the service component 106 can be utilized by the third party service provider 102. According to an example, the service component 106 can be utilized to effectuate performing backend services. Additionally or alternatively, the service component 106 can be an operating system for the third party service provider 102 that manages hardware and/or software resources (e.g., disparate service component(s)).

Further, the third party service provider 102 can comprise a replication component 108 that generates a replica of a state (e.g., of a computational task, of a user, associated with the service component 106, related to a client, . . . ) and/or a portion of the state. According to an illustration, the replication component 108 can evaluate data received via the interface component 104 (e.g., from client(s), disparate third party service provider(s), . . . ) and/or information yielded from the service component 106 to reproduce the state. The replication component 108 can automatically yield a replica of a state and/or generate the replica in response to a request (e.g., from a user, client, service that generates a backup, disparate third party service provider, . . . ). The replica can facilitate transitioning the state to a disparate client, for example.

The system 100 also can include N client devices (e.g. client device 1 110, client device N 112, . . . ), where N is any positive integer. By way of illustration, the client devices 110-112 can be desktop devices (e.g., personal computers), portable devices (e.g., laptops, tablets, handhelds such as personal digital assistants (PDAs), portable music players, portable gaming devices, . . . ), mobile phones, and the like. The client devices 110-112 can be thin clients utilized to access services hosted by the third party service provider 102 with minimal latency and interact with a user (e.g. receive user input, output content from the third party service provider 102, ...). The third party service provider 102 can concurrently service requests from any number of client devices 110-112 (e.g., received by way of the interface component 104). Further, the client devices 110-112 can be associated with any number of disparate users. By way of illustration, a subset of the N client devices 110-112 can be employed by a first user and a disparate subset of the N client devices 110-112 can be utilized by a second user; however, the claimed subject matter is not so limited.

Each of the client devices 110-112 (and/or each of the computational tasks effectuated by leveraging the client devices 110-112) can be associated with a state. For instance, the state can be a set of properties associated with the device, service, application, user, etc. Pursuant to an illustration, the state can relate to configurations, attributes, conditions and/or information content. According to an example, the client device 1 110 can be associated with a state that enables access to a set of data (e.g., retained by the third party service provider 102, rendered as part of a user interface, ...). Pursuant to this example, the client device 1 110 can communicate with the third party service provider 102 via the interface component 104. Further, the service component 106 can be employed to effectuate one or more services supported by the third party service provider 102. The replication component 108 can replicate the state (and/or a portion of the state) associated with the client device 1 110 and the replica can be provided to a disparate client device (e.g., client device N 112, ...) (however, it is contemplated that replicas need not be transferred between client devices 110-112). The disparate client device (e.g., the client device N 112, ...) can utilize the replica to return to the state, and thus, access a similar set of data as compared to the client device 1 110 (e.g., by rendering a similar user interface); hence, the user can access a consistent set of data when employing the client device N 112 (e.g., if the user switches from employing the client device 1 110 to the client device N 112). Thus, utilization of the replication component 108 can facilitate floating a state between multiple client devices 110-112. Additionally or alternatively, the replication component 108 can enable replicating a state (or a partial state) within a single computational task; thus, the computational task can utilize the replica for fault isolation or to provide redundancy, for instance.

The replication component 108 can replicate a state and/or a part of the state. According to an example, the replication component 108 can dynamically or statically mark a portion (or portions) of a state to be replicated. Further, the replication component 108 can determine parts of (e.g. a subset of) the original state to share with the replicated state (e.g., upon replicating the complete state). For example, when the state of a computational task is replicated and run on another node, the original and the replica can share similar resources (e.g., file). Pursuant to another illustration, the replication component 108 can replicate the state (e.g., associated with a computational task) any number of times, and the replica can be utilized to reinvoke the state (e.g., of the computational task) any number of time.

It is contemplated that the state replica yielded by the replication component 108 can be utilized in any manner. For instance, the state replication can enable a user to seamlessly interact with the third party service provider 102 (and/or the service component 106) while switching between differing client devices 110-112. Additionally, the replica of the state can be utilized by disparate third party service provider(s) to effectuate services without regenerating the state. Pursuant to an example, existing services can be transferred to the disparate third party service providers and/or new services can be initiated by the disparate third party service provider by employing the replica. Further, the output from the replication component 108 can be retained in memory (e.g., as a backup that can be restored). Also, the replica obtained from the replication component 108 can be utilized to resume the associated state.

Although the interface component 104 is depicted as being separate from the service component 106 and the replication component 108, it is contemplated that the service component 106 and/or the replication component 108 can include the interface component 104 or a portion thereof. Also, the interface component 104 can provide various adaptors, connectors, channels, communication paths, etc. to enable interaction with the service component 106 and/or the replication component 108.

Figure 2:
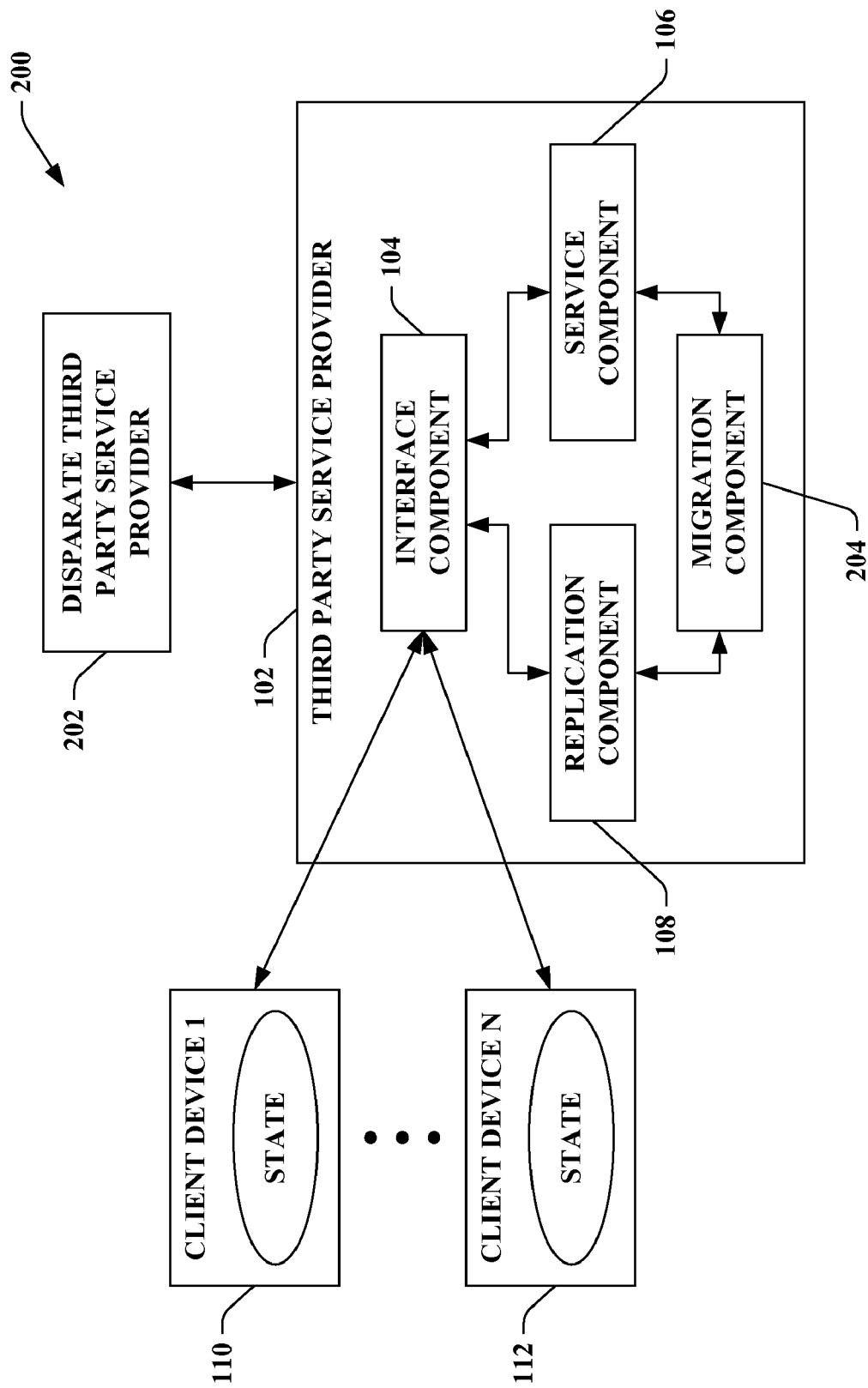
FIG. 2 illustrates a block diagram of an exemplary system that facilitates migrating computations between client device(s) and/or third party service provider(s).

Now turning to FIG. 2, illustrated is a system 200 that facilitates migrating computations between client device(s) and/or third party service provider(s). The system 200 includes the third party service provider 102, which can further comprise the interface component 104, the service component 106, and the replication component 108. Also, the system 200 can include a disparate third party service provider 202 (and/or any additional differing third party service providers (not shown)) that can be substantially similar to the third party service provider 102. The N client devices 110-112 can effectuate service(s) provided by the third party service provider 102 (and/or the disparate third party service provider 202) (e.g., by sending service requests to the interface component 104). Moreover, although not depicted, it is contemplated that one or more of the client devices 110-112 can connect directly to and utilize service(s) offered by the disparate third party service provider 202.

The third party service provider 102 can additionally include a migration component 204 that can shift performance of computational tasks between various components in the system 200. For instance, the migration component 204 can enable migrating computations between the client device 1 110 and the third party service provider 102. The migration can depend upon characteristics associated with the client device 1 110 such as limitations related to processing, memory, bandwidth, output capabilities (e.g., display real estate, availability of speakers, ...) and the like. Further, the migration component 204 can enable migrating the computations based upon a subscription (e.g., various user subscription packages that provide differing levels of access to service(s) supported by the third party service provider 102), available resources hosted by the third party service provider 102 (e.g., available CPU cycles, memory, bandwidth, ...), etc. Also, the migration component 204 can identify tasks and/or determine a platform based upon the identified task.

According to another example, a user can initiate a computational task from a first client device (e.g., the client device 1 110) and subsequently decide to continue the task with a disparate client device (e.g., the client device N 112); accordingly, performance of the computations can be shifted by the migration component 204 between differing client devices 110-112 or a client device (e.g., the client device 1 110) and the third party service provider 102 (e.g., and/or the disparate third party service provider 202). Further, the replication component 108 can enable evaluating and/or sharing a state related to the first client device (e.g., the client device 1 110) with the disparate client device (e.g., the client device N 112). The disparate client device (e.g., the client device N 112) can utilize the state shared from the replication component 108 to provide continuity; thus, the state associated with the first client device (e.g., the client device 1 110) need not be regenerated and instead can be passed between client devices 110-112.

Pursuant to an illustration, a user can initiate a computational task (e.g., a service supported by the service component 106) with a desktop computer. Accordingly, the service component 106 can effectuate generating data that can be provided to the desktop computer via the interface component 104 and the desktop computer can perform computations associated with rendering a corresponding graphical user interface based on the received data. While the computational task is ongoing, the replication component 108 can automatically copy the state associated with the desktop computer. For instance, the copy of the state can be continuously or periodically updated by the replication component 108; however, the claimed subject matter is not so limited. Thereafter, the user can decide to transition (e.g., with minimal latency) to utilizing a PDA to continue the computational task. Thus, the PDA can obtain the copy of the state generated by the replication component 108. Moreover, the migration component 204 can transfer computational tasks to be performed client-side (e.g., rendering of the graphical user interface) to the PDA. The migration component 204 can also redistribute the computational split (e.g., shift the amount and/or type of computational tasks effectuated by the client devices 110-112 versus with resources hosted by the third party service provider 102). The redistribution can be based on characteristics of the client device(s) 110-112, users, subscriptions, and so forth.

In accordance with another illustration, the migration component 204 can alter the computational task to be performed client-side. For example, if a first client device (e.g., the client device 1 110) with limited processing power, display real estate, etc. is utilized to render a graphical user interface, data corresponding to a scaled back version of the graphical user interface can be provided from the third party service provider 102. Further, upon transitioning to a second device (e.g. the client device N 112) that provides enhanced processing power, display real estate, and the like, the migration component 204 can enable transmitting data related to a richer graphical user interface that can be rendered.

Moreover, the migration component 204 can facilitate presenting a suggestion to a user to switch to a disparate one of the client devices 110-112. For instance, a user can be utilizing a laptop and the migration component 204 can identify the user's proximity to a plasma television (e.g., based upon an evaluation of the state provided by the replication component 108). Thereafter, the migration component 204 can output an indication suggesting that the user transition to the plasma television. Suggestions can be based upon an evaluation of user location, characteristics of the client devices 110-112, services being performed by the service component 106, output being rendered to the user, and the like. According to another example, the migration component 204 can automatically transition between the client devices 110-112.

According to a further example, the migration component 204 can enable handing-off between client devices 110-112. For instance, the migration component 204 can enable handing-off from a first client device (e.g., the client device 1 110) to a second client device (e.g., the client device N 112) in a live and continuous manner, while mitigating loss of state, context and/or data (e.g., hot replication from device to device). Thus, interaction with the third party service provider 102 can continue seamlessly while switching between client devices 110-112. The migration component 204 can support user desire to change the client device 110-112 in use for a computational task, and trigger state replication (e.g., with the replication component 108) and/or handoff from the first client device to the second client device. For example, the first client device in use can be a desktop computer and the user can desire to move to a mobile device such as a handheld computer. In accordance with another example, the first client device can be running out of battery life; thus, the migration component 204 can enable handing-off to a disparate client device. In yet a further example, handoff can be effectuated from the first client device to the second client device with the migration component 204 to take advantage of characteristics of the second client device (e.g., the second client device can yield a richer user interface).

Pursuant to another example, the migration component 204 can automatically facilitate handing-off upon a client device (e.g., one of the client devices 110-112) being switched on. Accordingly, a first client device (e.g., the client device 1 110) can be utilized in connection with the third party service provider 102, and then a second client device (e.g., the client device N 112) can be switched on; the migration component 204 can automatically handoff to the second client device upon recognizing a common user id and/or obtaining an input corresponding to a single button click for handing-off (e.g., smart user id based single click auto state replication and/or handoff). Thereafter, the second client device can continue to interact with the third party service provider 102. In accordance with the above, the migration component 204 can enable smart detection of new device startup based on a user id match. Further, the migration component 204 can handoff to the new device via a single click that enables transferring state associated with a live web application and/or computational task to the new device, for example.

Figure 3:
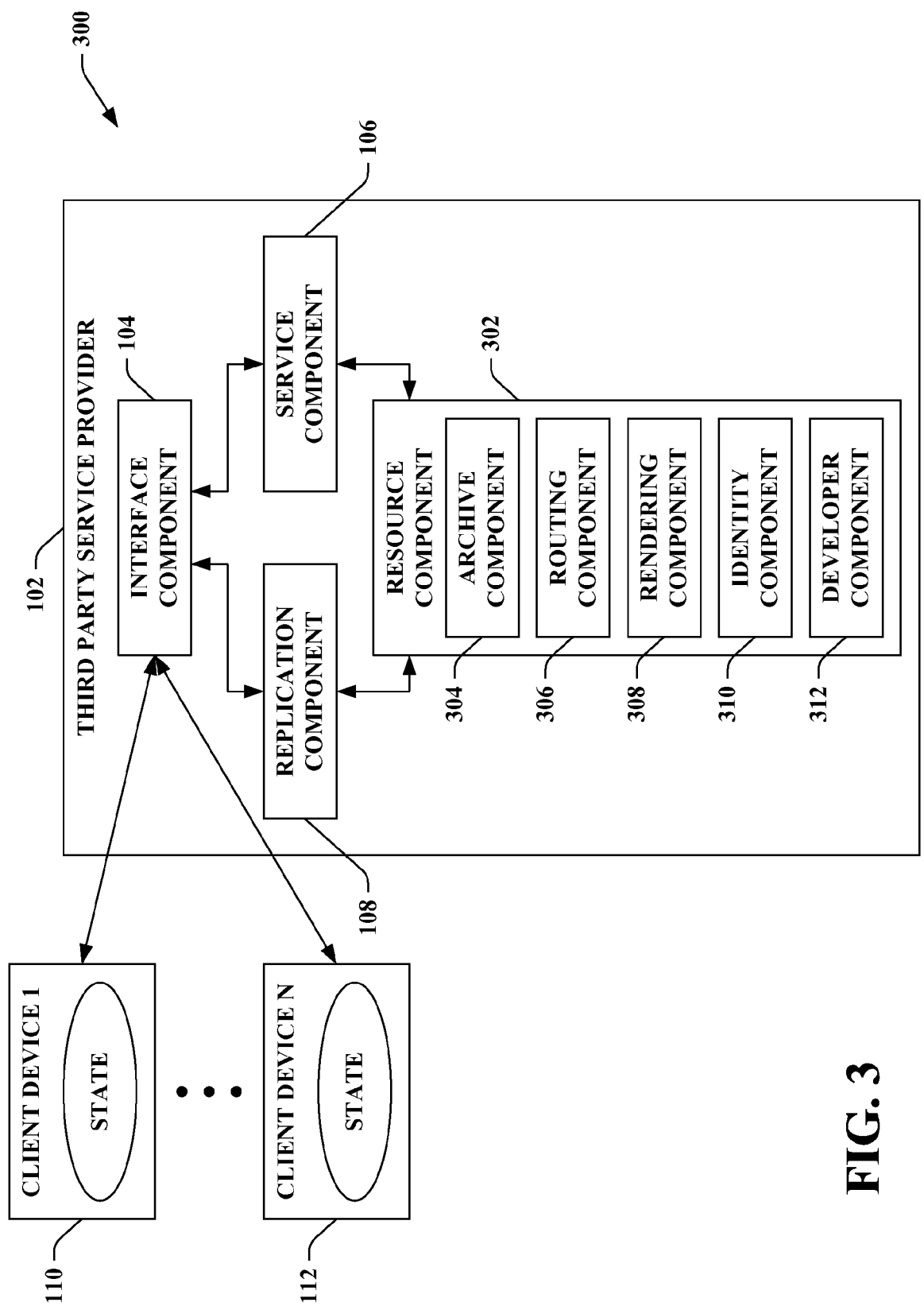
FIG. 3 illustrates a block diagram of an exemplary system that facilitates supplying resources hosted by a third party service provider to client device(s).

With reference to FIG. 3, illustrated is a system 300 that facilitates supplying resources hosted by a third party service provider (e.g. the third party service provider 102) to client device(s) (e.g., the client devices 110-112). The third party service provider 102 can include the interface component 104 that communicates with the client devices 110-112 and the service component 106 that effectuates performing service(s) remotely from the client devices 110-112. Further, the third party service provider 102 can include a resource component 302 that furnishes resources utilized in connection with transitioning a state from a first client device to a second client device by way of the replication component 108; however, the claimed subject matter is not limited to employing these resources for state replication.

The resource component 302 can include an archive component 304 that facilitates retaining data associated with any service supported by the service component 106. According to an example, the set of data provided by or prepared for the client devices 110-112 in connection with any service effectuated with the service component 106, or a subset thereof, can be retained by the archive component 304. For instance, replicated states from a plurality of services can be retained (and/or aggregated) by the archive component 304. Further, although not depicted, it is to be appreciated that the archive component 304 can retain such data in a data store (not shown).

Additionally, the resource component 302 can include a routing component 306 that can dynamically route data transferred to a user via the interface component 104. For example, the routing component 306 can route data to one or more of the client devices 110-112 based upon the user's state and/or information stored by the third party service provider 102. The information can be, for instance, preferences associated with routing, interrupting, and so forth. Additionally or alternatively, the information can relate to determining the user's state (e.g. data pertaining to the user's calendar, location, . . . ). Pursuant to another illustration, the routing component 306 can track movement of a cellular telephone to determine the user's state. The routing component 306 can analyze the movements of the cellular telephone to perform a classification to determine whether the user is traveling in a car, for instance. Accordingly, the routing component 306 can determine the client device 110-112 (e.g., the cellular telephone, a global positioning system (GPS) in the user's car, . . . ) to which data should be sent by the interface component 104. Moreover, the classification results obtained by the routing component 306 can be employed by the service component 106 to yield relevant content to the client device 110-112. For example, determination of a current location and direction of travel can be utilized with considerations of estimates of current capacity and latency of different roads; thus, in real time, shortest path calculations based upon expected time of arrival can be performed by the service component 106 and the results can be selectively transferred to one or more of the client devices 110-112.

The resource component 302 can further include a rendering component 308 that facilitates outputting data with the client devices 110-112. By way of illustration, the rendering component 308 can be a real time render farm that can include a plurality of graphics processing units (GPUs). The rendering component 308 can yield a high resolution graphics image that can be transmitted from the third party service provider 102 to the appropriate client device(s) 110-112. Also, the rendering component 308 can yield smart, per client device rendering of content.

Moreover, the resource component 302 can include an identity component 310 that manages multiple identities of a user. According to an illustration, a user can federate any number of disparate identities, and these identities can correspond to the user's work life, personal life, various interests, and so forth. Additionally, the user can have one or more identities for the third party service provider 102 and a different set of identities that relate to a disparate third party service provider (not shown). The identity component 310 can merge differing identities associated with a particular user. Further, the identity component 310 can enable the user to manage his or her disparate identities. For instance, the user can provide preferences employed by the identity component 310 that can be utilized to selectively push data to one or more of the client devices 110-112 based upon the state of the user. Additionally or alternatively, the identity component 310 can employ a trust hierarchy and/or a domain of trust to verify one or more identities of the user.

The resource component 302 can also include a developer component 312 that provides a platform upon which additional service(s) can be built. The developer component 312 enables creating service(s) (e.g., the service component 106) that can be employed by one or more client devices 110-112. Further, the developer component 312 can facilitate retaining the generated service(s) with the third party service provider 102 and/or assigning access permissions that can be utilized to determine a set of users that have access to the generated service(s). Additionally, the developer component 312 can expose a user profile model, which can be utilized in connection with building services that make sense of vast quantities of data (e.g., that can be retained by the archive component 304).

Figure 4:
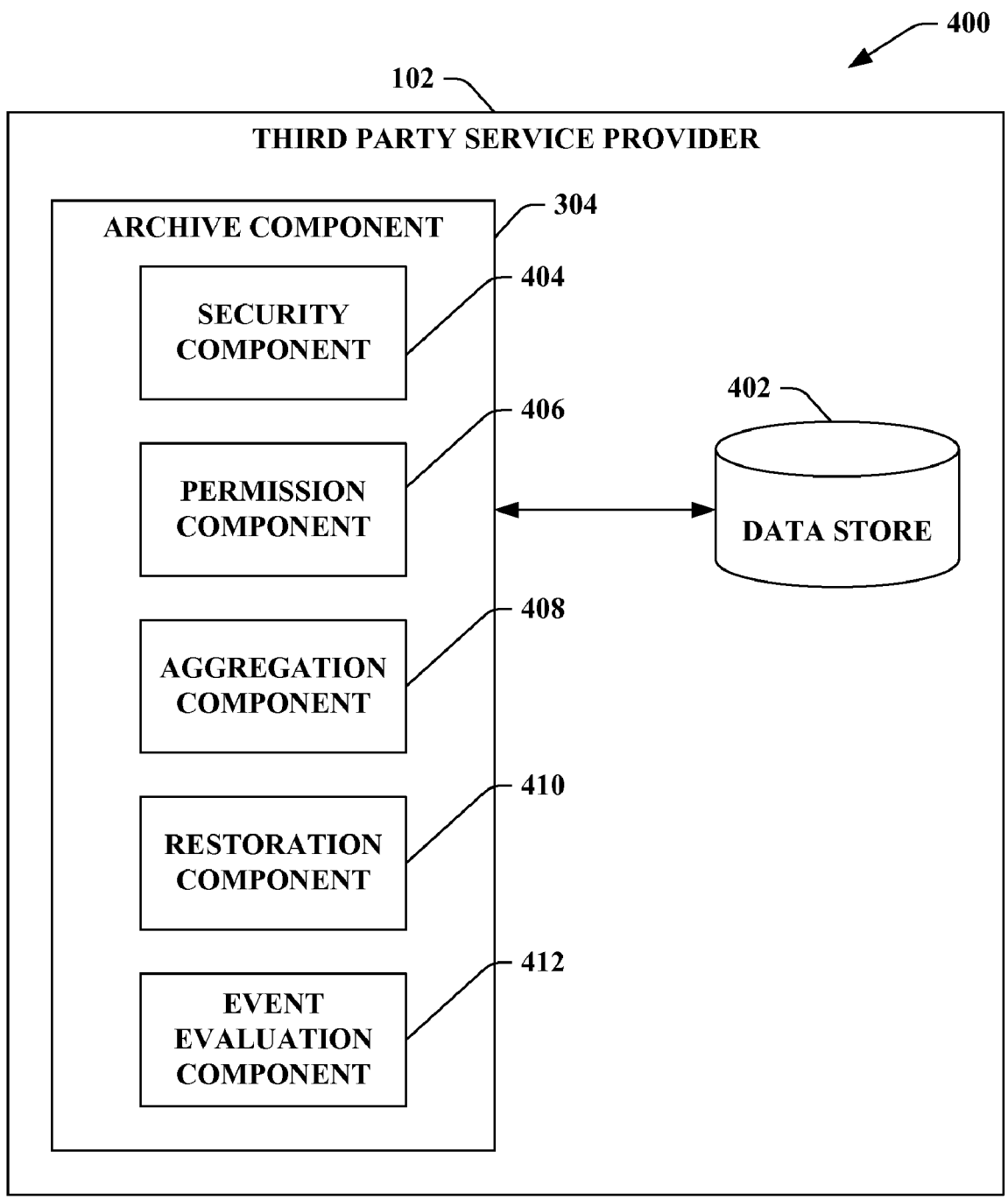
FIG. 4 illustrates a block diagram of an exemplary system that archives and/or analyzes data associated with service(s) supported by a third party service provider.

Now turning to FIG. 4, illustrated is a system 400 that archives and/or analyzes data associated with service(s) supported by a third party service provider (e.g., the third party service provider 102). The third party service provider 102 can include the archive component 304 and a data store 402 that can store data retained by the archive component 304. Although one data store is depicted, it is to be appreciated that any number of data stores similar to data store 402 can be employed, and the data stores can be centrally located and/or positioned at differing geographic locations. It is contemplated that the archive component 304 can provide multi-tiered storage within the data store 402. According to this example, unused data can be aged-out to slower disks and important data used more frequently can be moved to faster disks; however, the claimed subject matter is not so limited.

The data store 402 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 402 of the subject systems and methods is intended to comprise, without being limited to, these and any other suitable types of memory. In addition, it is to be appreciated that the data store 402 can be a server, a database, a hard drive, and the like.

The archive component 304 can further include a security component 404, a permission component 406, an aggregation component 408, a restoration component 410 and/or an event evaluation component 412. The security component 404 protects against unauthorized access and/or use of data retained by the archive component 304. The security component 404 enhances confidentiality, integrity and availability of the archived data. For instance, the security component 404 can encrypt data transferred to client devices (not shown) and/or decrypt data obtained from the client devices. Moreover, the security component 404 can certify and/or authenticate data retained by the archive component 304. According to an example, the security component 404 can analyze whether a user can access and/or use data based upon an identity determined from usernames, passwords, personal identification numbers, personal status, management positions, occupation hierarchy, biometric indicia (e.g., voice recognition, fingerprint analysis, retina analysis, . . . ), and the like.

The permission component 406 can enable a user to assign arbitrary access permissions to various users, groups of users and/or all users. For instance, the permission component 406 can obtain explicit preferences related to granting of permissions from a user, which can be enforced. Additionally or alternatively, the permissions can be implied and/or inferred by the permission component 406 based upon considerations related to the user's history, permissions set by disparate users, type of content, and so forth.

Further, the aggregation component 408 assembles and/or analyzes collections of data. The aggregation component 408 can seamless incorporate third party data into a particular user's data. Additionally, the aggregation component 408 can combine data from any number of users that employ the third party service component 102 and/or disparate sources (e.g., sensors, cameras, . . . ) and perform data correlation across service platforms and/or applications. According to an example, the aggregation component 408 can track motion of objects monitored with RFID devices, and an analysis performed upon the motion data by the aggregation component 408 can identify bottlenecks in shipping. Moreover, the aggregation component 408 can effectuate data mining on the collected data. However, the claimed subject matter is not limited to the aforementioned examples.

Moreover, the restoration component 410 rolls back data retained by the archive component 304. For example, the restoration component 410 can continuously record an environment associated with the third party service provider 102. Further, the restoration component 410 can playback the recording. Additionally, the restoration component 410 can restore a replica of a state (e.g., generated by the replication component 108 of FIG. 1) to return to such state.

The event evaluation component 412 evaluates saved data (e.g. from the data store 402) to review history associated with a current or future event. According to an illustration, an amount of chatter (e.g., from blogs, instant messages, emails, . . . ) about a soon to be released product can be analyzed by the event evaluation component 412 to gain an understanding of customer reaction to the upcoming product release; thus, appropriate marketing strategies can be implemented. It is to be appreciated that the event evaluation component 412 can correlate fused data from disparate service platforms and/or applications to evaluate emerging events.

Figure 5:
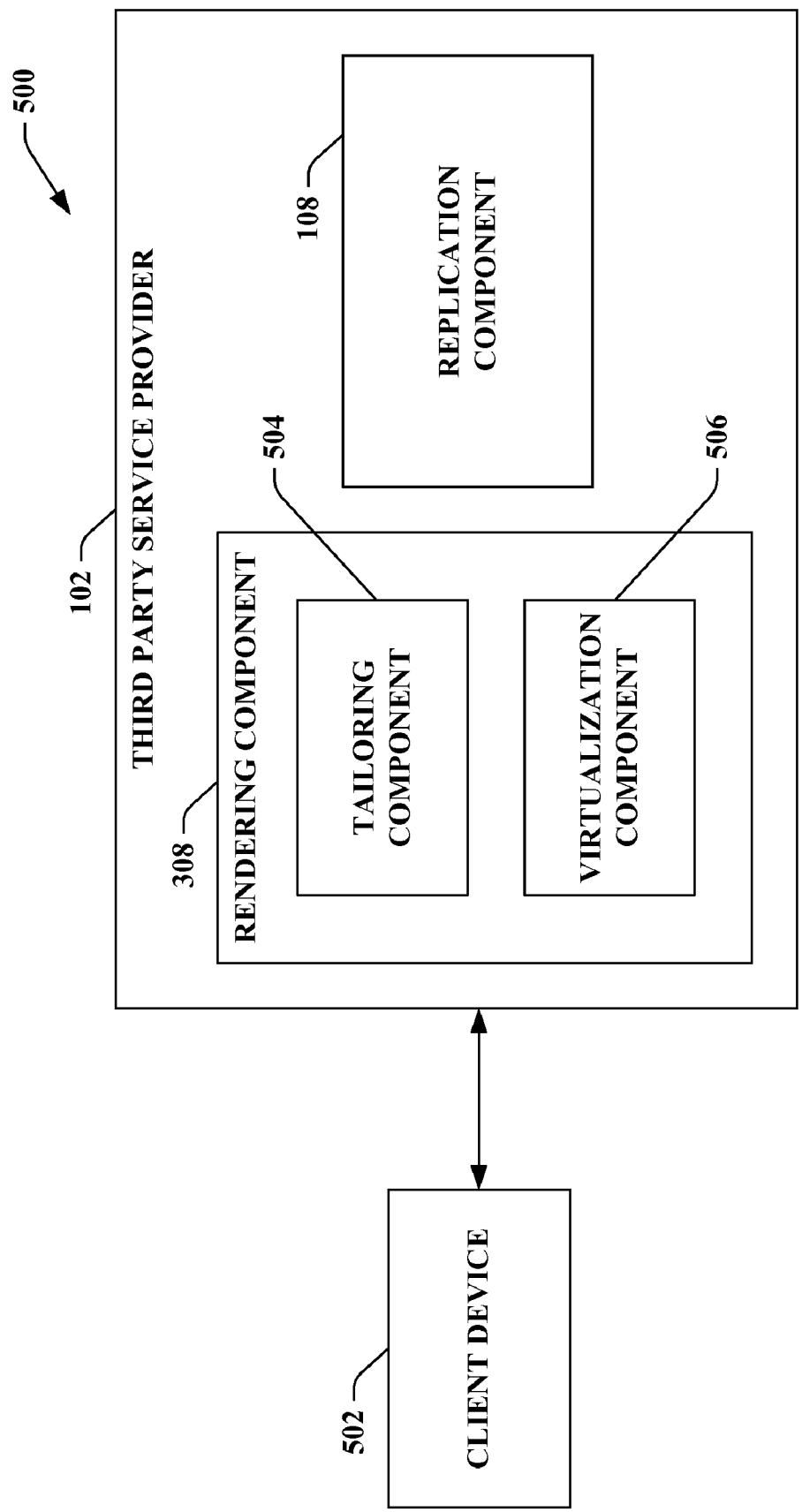
FIG. 5 illustrates a block diagram of an exemplary system that renders a user interface upon a client device.

With reference to FIG. 5, illustrated is a system 500 that renders a user interface upon a client device. The system 500 includes the third party service provider 102 that further comprises the replication component 108 and the rendering component 308. The rendering component 308 enables a client device 502 (e.g., one of the client devices 110-112 of FIG. 1) to generate a user interface. Further, the replication component 108 generates a replica of a state associated with the client device 502, and the replica can be utilized to transition to a disparate client device (not shown) to output the user interface yielded by the rendering component 308, for instance.

The rendering component 308 includes a tailoring component 504 that modifies the rendered user interface based upon the client device 502. The tailoring component 504 can consider characteristics of the client device 502 such as display size and/or processor limitations, and can transfer different data to the client device 502 (e.g. corresponding to disparate views) based upon these characteristics. Thus, data that can be utilized to generate a more detailed map can be provided by the tailoring component 506 (and the rendering component 308) to a desktop computer as compared to a cellular telephone.

Moreover, the rendering component 308 can include a virtualization component 506 that enables rendering a user interface that virtualizes an experience of walking through a building. The virtualization component 506 can provide a platform that allows third parties to build objects (e.g. corresponding to their stores). Further, with the virtualization component 506, any number of images can be stitched together. According to an example, an online book retailer can create a user interface that can be rendered by the client device 502 that simulates physically being in a bookstore. Thus, a user can move through the store, view spines of books on shelves, take books off of the shelves, etc. Further, differing amounts of display real estate (e.g., modifying book size, orientation, number of virtual copies on the shelves, . . . ) can be utilized based upon book popularity, preferences, recommendations, history of similar users, and so forth.

Figure 6:
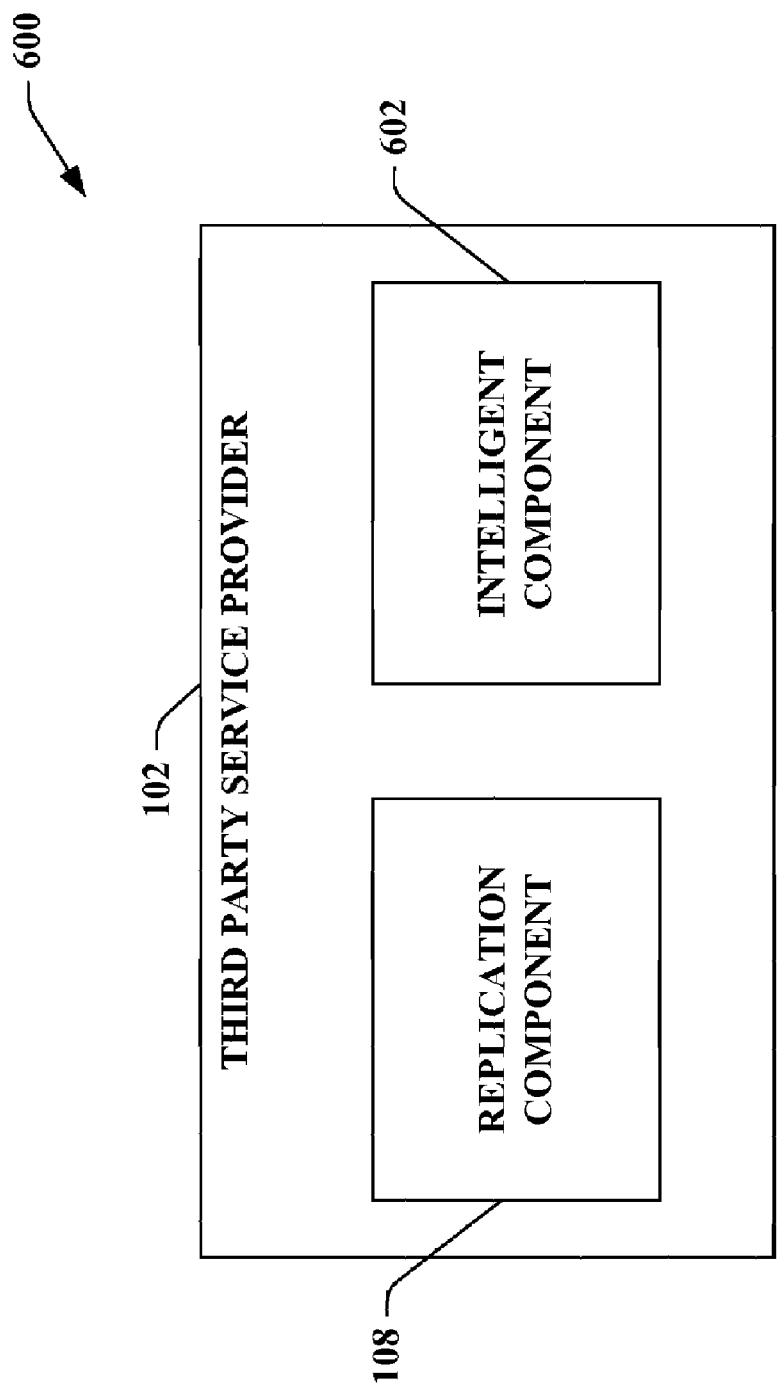
FIG. 6 illustrates a block diagram of an exemplary system that infers a state associated with a device, service, application and/or user.

Turning to FIG. 6, illustrated is a system 600 that infers a state associated with a device, service, application and/or user. The system 600 can include the third party service provider 102 and the replication component 108, each of which can be substantially similar to respective components described above. The system 600 can further include an intelligent component 602. The intelligent component 602 can be utilized by the replication component 108 to reason about a current state of a device, service, application, user, etc. For instance, the intelligent component 602 can evaluate data generated utilizing a service supported by the third party service provider 102 and/or data received from a client device to infer characteristics of the state. Pursuant to another example, the intelligent component 602 can be utilized with a rendering component (not shown) (e.g., the rendering component 308 of FIG. 3) to change a user interface based upon a prediction of upcoming data. According to an example, traffic camera data can be evaluated corresponding to a location 5-10 minutes ahead of a traveling user that employs a mapping service supported by the third party service provider 102. Based upon a prediction of upcoming traffic inferred by the intelligent component 602, a map with driving directions can be updated to account for inferred delays, traffic conditions, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
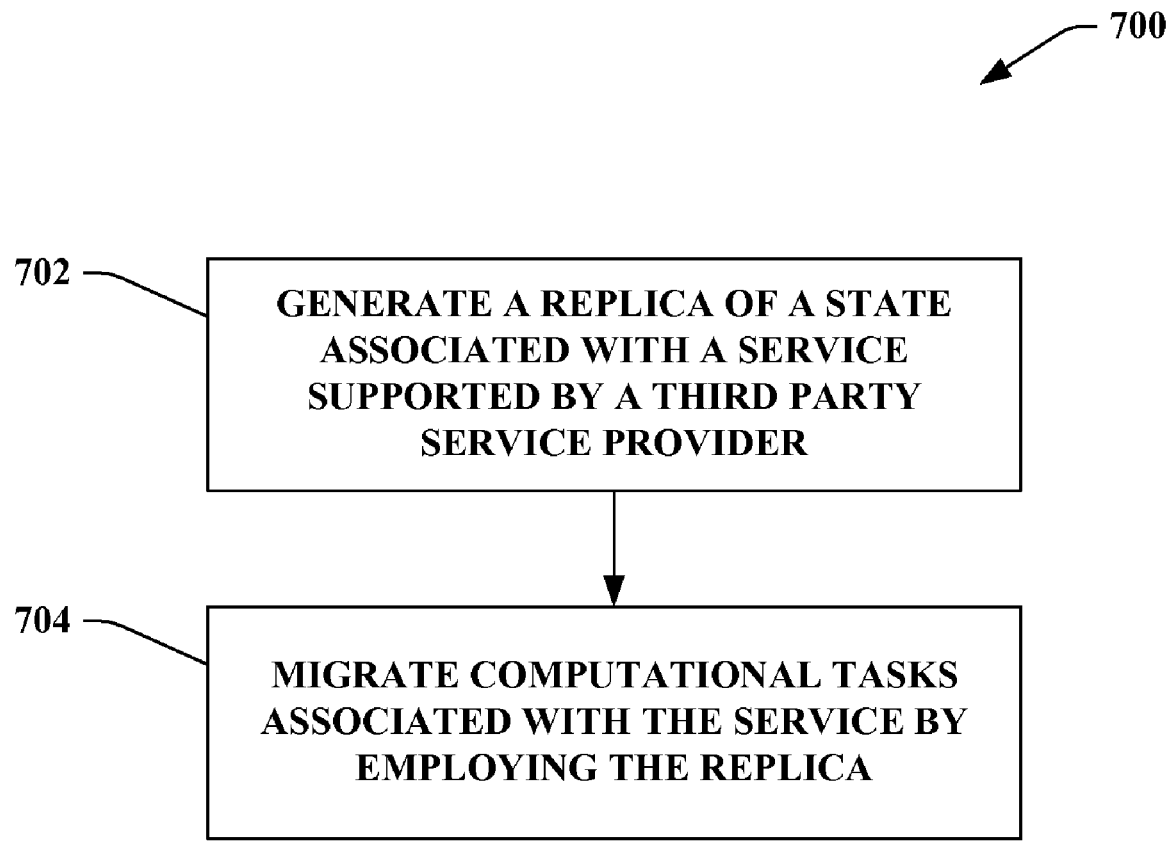
FIG. 7 illustrates an exemplary methodology that facilitates migrating computational tasks.
Figure 8:
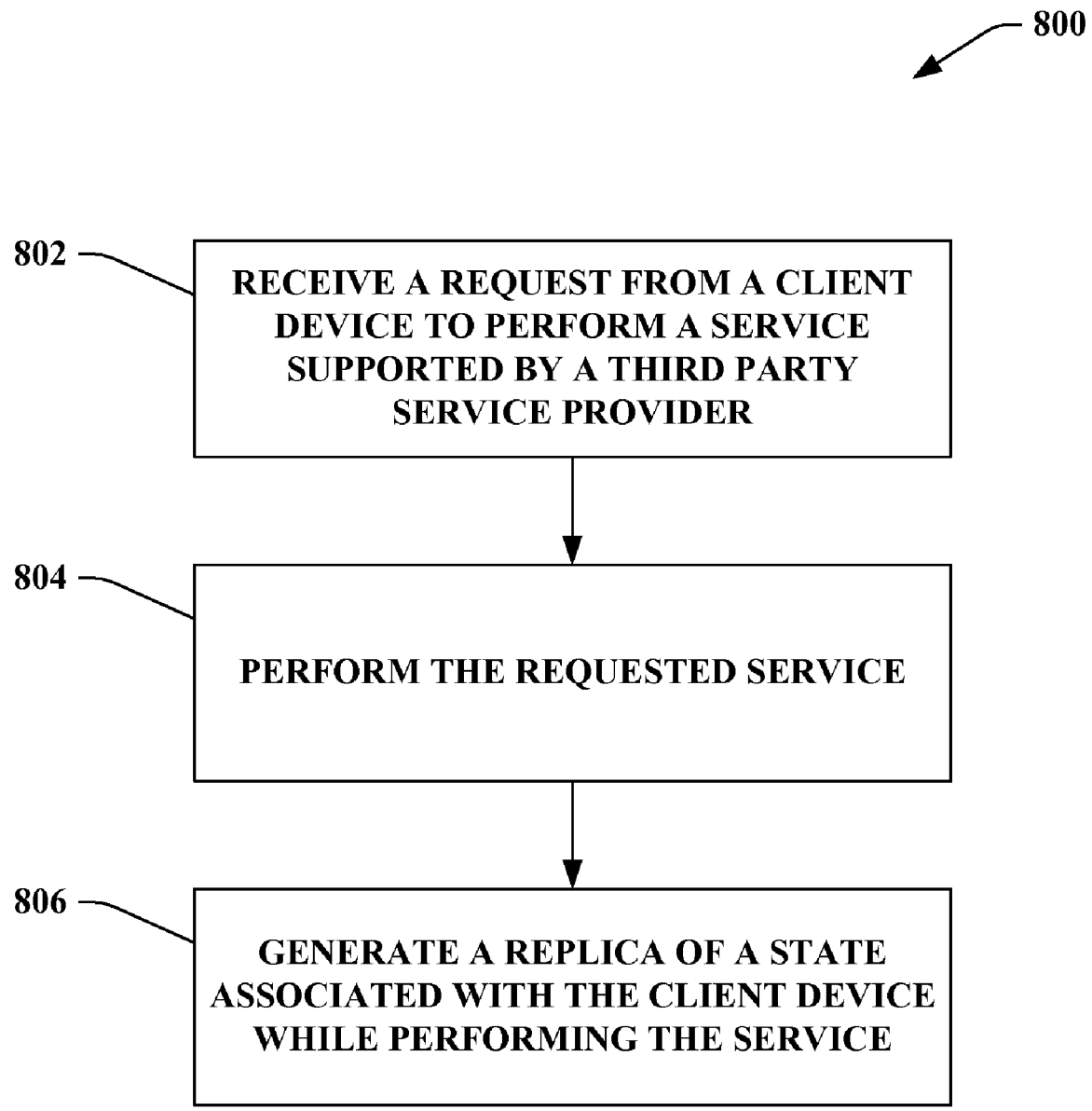
Figure 9:
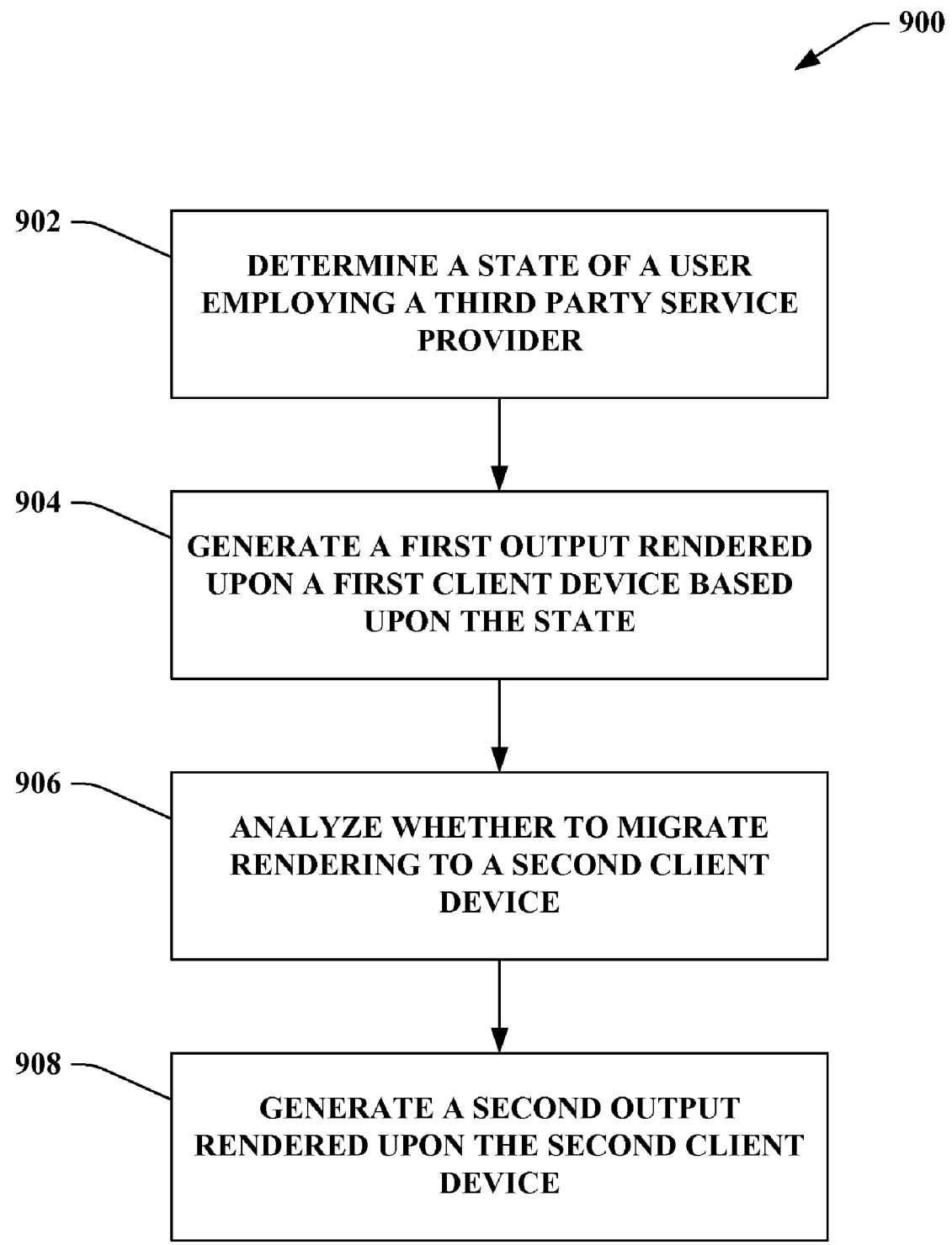
FIG. 9 illustrates an exemplary methodology that facilitates inferring whether to transition between disparate client devices.

FIGS. 7-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 7, illustrated is a methodology 700 that facilitates migrating computational tasks. At 702, a replica of a state associated with a service supported by a third party service provider can be generated. The state can pertain to configurations, attributes, conditions, informational content, etc. related to a device, service, application, user, and so forth. According to an example, the state can include information related to client device type and associated characteristics (e.g., bandwidth, processing power, display size, . . . ). Pursuant to another illustration, the state can be a set of accessible data; however, the subject claims are not limited to the aforementioned examples. The replica of the state can be determined by evaluating data obtained by the third party service provider from one or more client devices. Moreover, information related to the service effectuated by the third party service provider can be analyzed. Replicas of the state can be yielded automatically and/or in response to a request.

At 704, computational tasks associated with the service can be migrated by employing the replica. For instance, the computations can be migrated between client(s) and a third party service provider(s). The migration can depend upon characteristics associated with a client device such as limitations related to processing, memory, bandwidth, and the like. By way of example, a user can initiate a computational task from a first client device and subsequently decide to continue the task with a disparate client device; accordingly, performance of the computations can be shifted between differing client devices or a client device and the third party service provider. Utilization of the replica enables seamless handoffs to occur while effectuating migration by providing state continuity.

Now referring to FIG. 8, illustrated is a methodology 800 that facilitates replicating a state associated with a client, user, service, application, and the like. At 802, a request from a client device to perform a service supported by a third party service provider can be received. It is contemplated that any type of service can be hosted by the third party service provider such as, but not limited to, backend services, storage services, computational services, word processing services, gaming services, spreadsheet services, presentation services, web syndication services, electronic mail services, rendering services, and so forth. At 804, the requested service can be performed. Any number of services requested by any number of disparate users/client devices can concurrently be effectuated. At 806, a replica of a state associated with the client device can be generated while performing the service. The replica can be retained, utilized to effectuate seamless migration, analyzed to yield optimization suggestions (e.g. alert indicating an advantage associated with employing a disparate client device, . . . ), employed to modify a rendered graphical user interface, etc.

With reference to FIG. 9, illustrated is a methodology 900 that facilitates inferring whether to transition between disparate client devices. At 902, a state of a user employing a third party service provider can be determined. For instance, geographic location, employed services, client device characteristics, and so forth can be analyzed to determine the state. At 904, a first output rendered upon a first client device can be generated based upon the state. The first output can be employed by the first client device to yield a graphical user interface, for example. Further, the first output can be tailored based upon characteristics such as processing power, bandwidth, memory, display size, etc. of the first client device.

At 906, an analysis can be effectuated to determine whether to migrate rendering to a second client device. The analysis can consider user proximity to the second client device, whether the user has permission to utilize the second client device, characteristics of the second client device, upcoming events, and so forth. At 908, a second output rendered upon the second client device can be generated. The transition between client devices can be performed automatically and/or in response to obtained feedback (e.g. from a user, device, service, . . . ).

Figure 10:
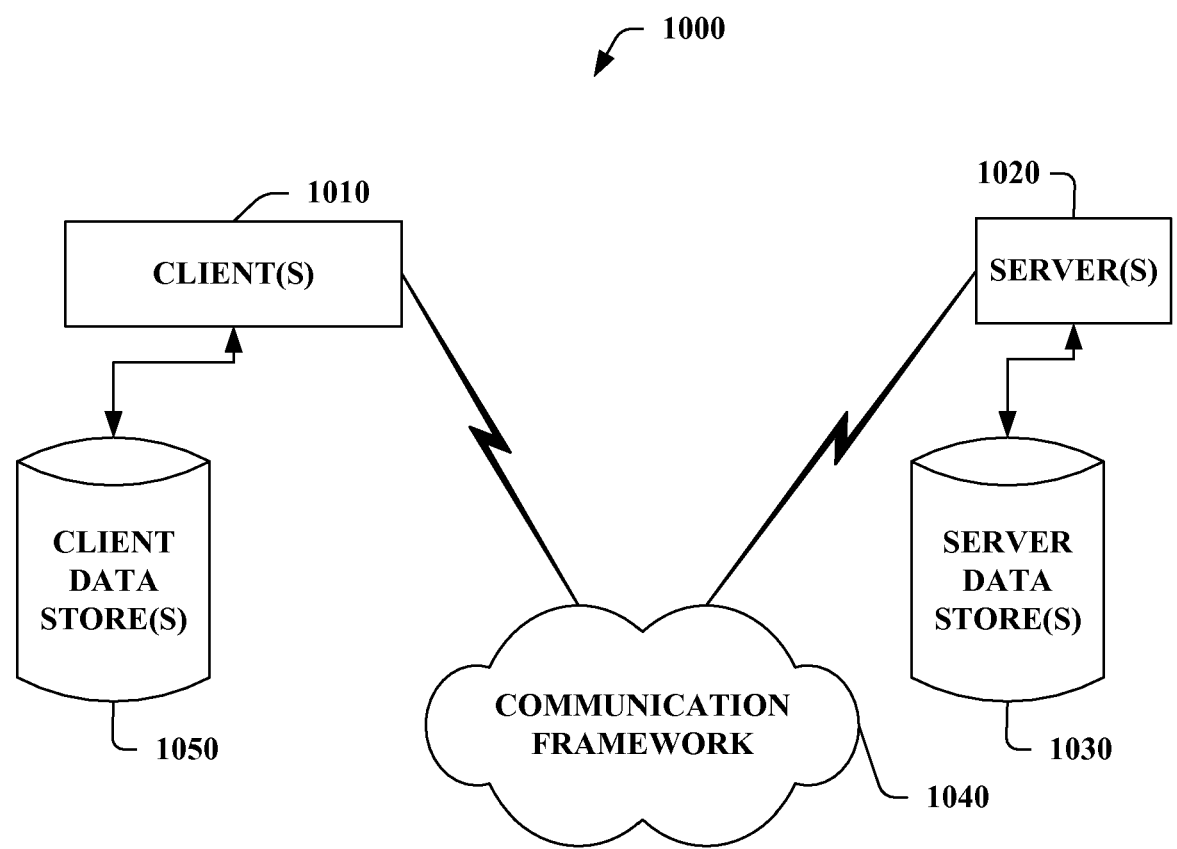
FIG. 10 illustrates an exemplary networking environment, wherein the novel aspects of the claimed subject matter can be employed.
Figure 11:
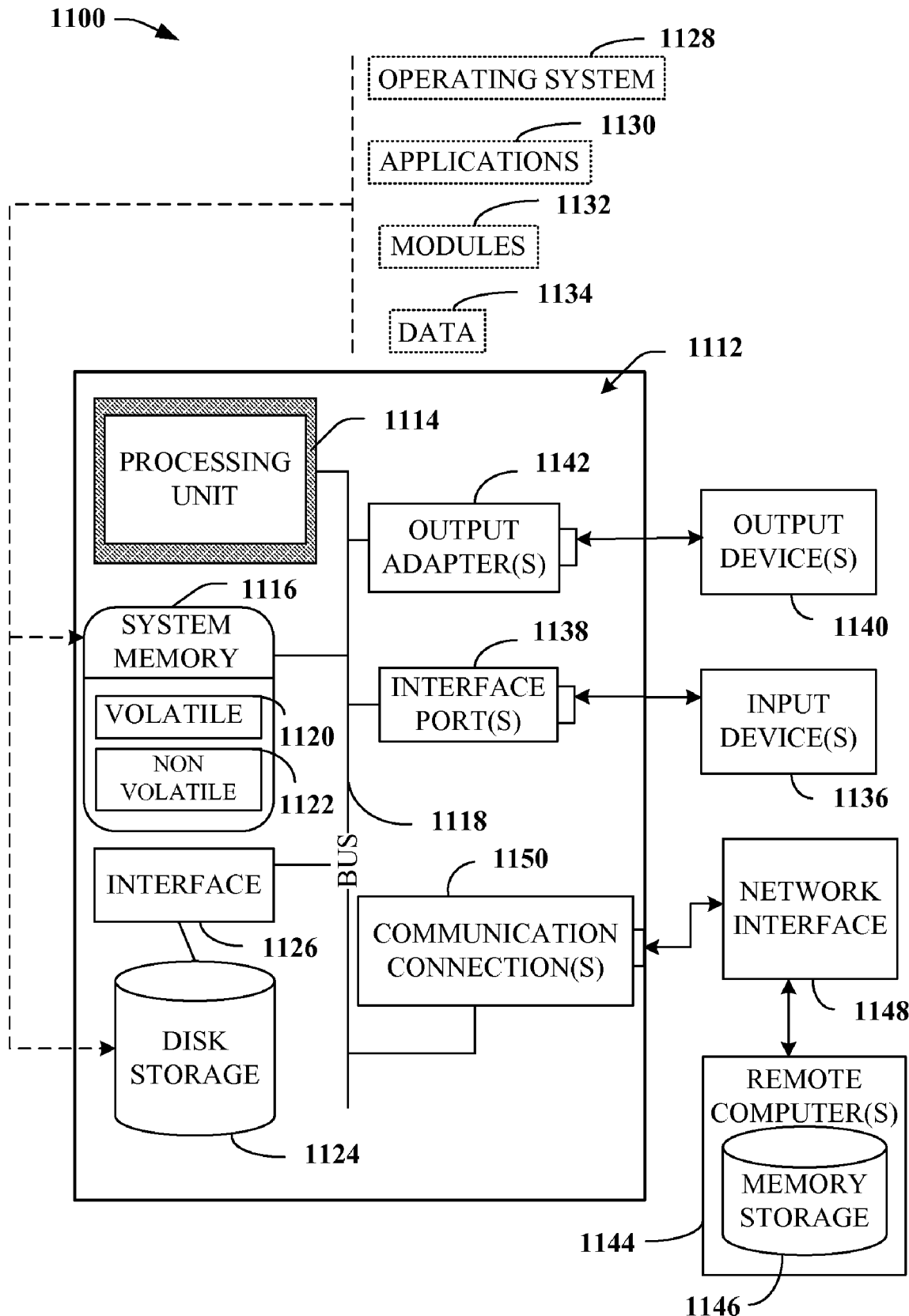
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with generating and/or utilizing replicas of states. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates replicating a state associated with a third party service provider, comprising:
    a processor;
    a memory, on which are stored processor executable instructions, which when executed by the processor cause the system to replicate the state associated with the third party service provider;
    a service component that effectuates performing a service supported by the third party service provider in response to a request obtained from a first client device;
    a replication component that generates a replica of a state associated with the service, wherein the replica facilitates seamless interaction with the third party service provider; and
    a migration component that shifts performance of computational tasks performed by the first client device to a second client device based at least in part by:
        recognizing a user ID associated with both the first client device and the second client device;
        determining if the second client device is in physical proximity to the first client device;
        generating a suggestion to a user of the first client device to transition to the second client device;
        receiving input, in response to the suggestion, of a single button click directing transfer of the third party service to the second client device;
        transferring the state from the first client device to the second client device via utilizing the replica; and
        redistributing a computational split, after shifting performance of computational tasks to the second client, of computational tasks performed by the client device versus computational tasks performed by the third party service provider, wherein the redistributing is based on differences resulting from migration from first client device to second client device; and
    a user interface, wherein the user interface presents the service provided by the third party service provider for display on the second client device, and wherein the user interface changes, based on:
        a prediction of upcoming data; and
        a consideration of characteristics of the second client device, including display size and processor limitations.

2. The system of claim 1, the replication component yields the replica of the state of a computational task.

3. The system of claim 2, the computational task utilizes the replica of its own state.

4. The system of claim 1, the replication component marks a portion of the state to be replicated and generates the replica that corresponds to the portion.

5. The system of claim 1, the replication component enables sharing a portion of the generated replica.

6. The system of claim 1, the replication component generates the replica of the state a plurality of times.

7. The system of claim 1, the replication component replicates a distributed state split between the first client device and at least one disparate client device.

8. The system of claim 1, further comprising a rendering component that outputs data utilized to yield per client device rendering of content.

9. The system of claim 1, further comprising an archive component that retains data provided to the service component and generated by the service component, the data being aggregated from the replicated state of a plurality of services.

10. The system of claim 1, the replica enables resuming the state.

11. A method that facilitates migrating, from a first client device to a second client device, computational tasks performed in connection with a third party service provider, comprising:
    storing, in a memory communicatively coupled to a processor, computer-executable instructions for performing the method that facilitates migrating, from the first client device to the second client device, computational tasks performed in connection with a third party service provider;
    executing the instructions on the processor;
    according to the instructions being executed:
    generating a replica of a state associated with a service supported by the third party service provider on the first client device; and
    migrating computational tasks associated with the service, from the first client device to the second client device, by employing the replica of the state to provide state continuity, wherein the migrating comprises:
        recognizing a user ID associated with both the first client device and the second client device;
        determining if the second client device is in physical proximity to the first client device;
        generating a suggestion to a user of the first client device to transition to the second client device;
        receiving input, in response to the suggestion, of a single button click directing transfer of the third party service to the second client device;
        transferring the state from the first client device to the second client device consistent with the replica;
        redistributing a computational split, after migrating computational tasks from the first client to the second client, of computational tasks performed by the client device versus computational tasks performed by the third party service provider, wherein the redistribution is based on differences resulting from migration from first client device to second client device; and
    changing a user interface, presenting the service provided by the third party service provider to the second client device, based on:
        a prediction of upcoming data; and
        a consideration of characteristics of the second client device, including display size and processor limitations.

12. The method of claim 11, generating the replica further comprises evaluating data obtained by the third party service provider from one or more client devices requesting the service and data related to the service effectuated by the third party service provider.

13. The method of claim 11, further comprising inferring whether to migrate the computational tasks based upon one or more of a permission, characteristics of the disparate client devices, and an upcoming event.

14. The method of claim 11, further comprising rendering a tailored user interface based upon characteristics of a client utilized for presentation.

15. The method of claim 11, further comprising accessing a consistent set of data by utilizing the replica of the state.

16. A system that facilitates replicating a state associated with at least one of a client, a user, a service, and an application, comprising:
   means for processing instructions within a computing environment;
   means for storing the instructions on a memory, which when executed by a processor within the computing environment cause the system to replicate a state associated with at least one of a client, a user, a service, and an application;
   means for receiving a request to perform a service supported by a third party service provider from a client device;
   means for performing the requested service;
   means for generating a replica of a state associated with the service on the first client device while performing the service on the first client device; and
   means for migrating computational tasks associated with the service, from the first client device to the second client device, by employing the replica of the state to provide state continuity, wherein the migrating comprises:
   means for recognizing a user ID associated with both the first client device and the second client device;
   means for determining if the second client device is in physical proximity to the first client device;
   means for generating a suggestion to a user of the first client device to transition to the second client device;
   means for receiving input, in response to the suggestion, of a single button click directing transfer of the third party service to the second client device;
   means for transferring the state from the first client device to the second client device consistent with the replica; and
   means for redistributing a computational split, after migrating computational tasks to the second client, of computational tasks performed by the client device versus computational tasks performed by third party service provider, wherein the redistributing is based on differences resulting from migration from the first client device to the second client device; and
   means for changing a user interface, presenting the service provided by the third party service provider to the second client device, based on:
   a prediction of upcoming data; and
   a consideration of characteristics of the second client device, including display size and processor limitations.

* * * * *